United States Patent [19]

Junior et al.

[11] Patent Number: 4,600,732

[45] Date of Patent: Jul. 15, 1986

[54] POLYBENZIMIDAZOLE POLYMER AND POWDER FILLER REINFORCED ELASTOMERIC COMPOSITION FOR USE AS A ROCKET MOTOR INSULATION

[75] Inventors: Kenneth E. Junior, Madison; James D. Byrd; James O. Hightower, Jr., both of Huntsville, all of Ala.

[73] Assignee: Thiokol Corporation, Chicago, Ill.

[21] Appl. No.: 562,332

[22] Filed: Dec. 16, 1983

[51] Int. Cl.$^4$ .......................... C08K 3/36; C08K 3/22
[52] U.S. Cl. ................... 523/138; 523/179; 524/502
[58] Field of Search ............... 523/138, 179; 524/502

[56] References Cited

U.S. PATENT DOCUMENTS

| | | | |
|---|---|---|---|
| 3,954,701 | 5/1976 | Schaffling | 523/138 |
| 4,126,741 | 11/1978 | Carleton et al. | 528/44 |
| 4,126,742 | 11/1978 | Carleton et al. | 528/44 |
| 4,316,969 | 2/1982 | Koyama et al. | 525/134 |

FOREIGN PATENT DOCUMENTS 2136979  12/1972  France ........................... 523/138

Primary Examiner—Lewis T. Jacobs
Attorney, Agent, or Firm—George F. Wheeler; Gerald K. White

[57] ABSTRACT

An elastomeric composition suitable for use as a rocket motor case insulation is disclosed. The composition comprises a vulcanizable elastomeric material and reinforcing polybenzimidazole polymer fibers in combination with a powder filler. A preferred embodiment utilizes polyisoprene as the elastomer and silica as the powder filler. These compositions have better erosion resistance than asbestos-reinforced compositions, and do not pose the environmental or safety risks associated with asbestos-reinforced insulation.

8 Claims, 3 Drawing Figures

POLYBENZIMIDAZOLE POLYMER AND POWDER FILLER REINFORCED ELASTOMERIC COMPOSITION FOR USE AS A ROCKET MOTOR INSULATION

BACKGROUND OF THE INVENTION

The invention relates to the incorporation of silica powder and polybenzimidazole (PBI) polymer fibers into an elastomeric insulation for rocket motor casings.

The combustion of a solid rocket propellant charge creates a hostile environment characterized by extremely high temperature, pressure, and turbulence in the interior of the rocket motor. Temperatures typically exceed 5,000 degrees Fahrenheit (2760 degrees Celsius). Interior pressure may typically exceed 1,500 psi ($1.02 \times 10^5$ g/cm$^2$). Chamber gas velocity typically may reach Mach 0.2 at the aft end of the rocket motor. This environment is considered particularly hostile because the combustion gas typically contains dispersed particles consisting essentially of aluminum oxide liquid droplets. These suspended droplets are believed to produce erosion of the rocket motor case insulating by a sandblasting effect. While the combustion of rocket propellant is usually of short duration, the conditions described above can destory unprotected rocket motor casings.

Those parts of the rocket structure which are exposed to the high temperatures, pressures, and erosive flow conditions generated by the burning propellant are usually protected by applying a lining of insulation. Various materials, both filled and unfilled, have been tried as insulation. These include phenolic resins, epoxy resins, high temperature melamine-formaldehyde coatings, ceramics, polyester resins and the like. These materials, when cured, usually become rigid structures which crack or blister when exposed to the rapid temperature and pressure changes occurring when the propellant is burned. Some rubber-like elastomeric systems have been tried as insulation. These systems are ablative insulation because the elastomer is sacrificed or consumed during combustion, but nevertheless provides some protection for the rocket chamber.

The best rocket insulation materials previously known to the art are elastomeric polymers reinforced with asbestos. Such systems are capable of enduring for a time sufficient to allow complete combustion of the propellant. Asbestos-reinforced elastomeric insulation systems are the subject of U.S. Pat. No. 3,421,970, to Daley et al., issued Jan. 14, 1969, and U.S. Pat. No. 3,347,047, to Hartz et al., issued Oct. 17, 1967. Those patents are hereby incorporated herein by reference.

Environmental and health concerns have led manufacturers to seek an acceptable replacement for the asbestos in rocket motor case insulation. One alternative elastomeric insulation contains aramid polymer fibers in combination with a powder filler. That insulation is disclosed and claimed in U.S. patent application Ser. No. 328,333, filed Dec. 7, 1981, now U.S. Pat. No. 4,492,779, and assigned to the owner of the present invention. The polyaramid fiber reinforced materials, however, have been found less erosion resistant than asbestos reinforced materials.

PBI fibers are known to be useful for applications requiring high temperature resistance, but have not been used within a rocket engine casing as a part of its insulation, or in an equivalent environment.

SUMMARY OF THE INVENTION

The invention is a polybenzimidazole (PBI) polymer fiber and powder filler reinforced elastomeric rocket motor insulation composition comprising:

A. From about 1 to about 40 percent by weight polybenzimidazole polymer fibers;

B. From about 1 to about 75 percent by weight powder filler; and

C. A vulcanizable elastomer.

The invention also provides a method for insulating a solid propellant rocket motor, comprising the step of applying an elastomeric insulation having the preceding composition to the interior surface of a rocket motor casing.

The inventors have discovered that polybenzimidazole polymer fibers in combination with a powder filler in elastomeric rocket motor case insulation have greater erosion resistance than asbestos-reinforced rocket motor insulation.

DETAILED DESCRIPTION OF THE INVENTION

Figure 1:
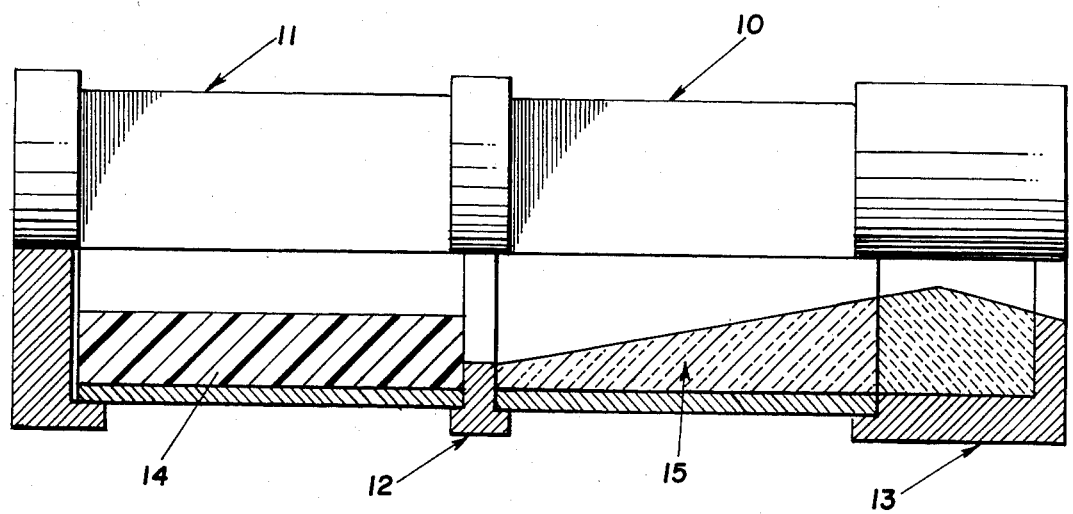
FIG. 1 is a longitudinal elevation of an insulation test motor, partially sectioned, illustrating a method for testing the invention.

PBI fibers are the fiber filler for insulation compositions of the present invention. The term "polybenzimidazole polymer" (or "PBI") as used herein means a polymer having recurring units of the formula:

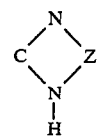

wherein —Z— is an aromatic nucleus and the nitrogen atoms forming the benzimidazole ring are attached to adjacent carbon atoms of the aromatic nucleus.

In addition to the above, tetraamino aromatic compounds containing a pair of ortho disposed amino groups can be reacted with either a diphenylester or an anhydride of an aromatic dicarboxylic acid to form a polybenzimidazole of the head-head, tail-tail variety. These polymers may be represented as consisting essentially of recurring units of the formula

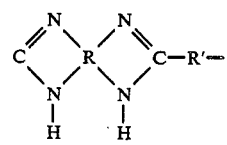

wherein R is a symmetrically tetrasubstituted aromatic nucleus and the nitrogen atoms forming each benzimidazole ring are attached to adjacent carbon atoms of the aromatic nucleus, R' being a member of the class consisting of (I) a carbocyclic aromatic ring and (II) a heterocyclic ring from the class consisting of (A) pyridine, (B) pyrazine, (C) furan and (D) quinoline. Illustrative polybenzimidazole polymers include poly-2,5,6-benzimidazole, poly-2,2' (m-phenylene)-5,5'-bibenzimidazole, poly-2,6-(m-phenylene)-diimidazobenzene, poly-2,2'-(pyridylene3",5")-bibenzimidazole, poly-2,2'-(furylene-2",5"')-5-5'-bibenzimidazole, poly-2,2' (p-phenylene)-5,5'-bibenzimidazole, poly-2,6-(p-phenylene)-diimidazobenzene, poly-2,2'-biphenylene-4")-5,5'-bibenzimidazole, poly-2,2'-diphenylene-2",2"')-5,5-bibenzimidazole, and poly-2,2-napthalene-1",6"')5,5'-bibenzimidazole. These and other polybenzimidazole polymers suitable for use in the present invention are disclosed in U.S. Pat. No. Re. 26,065 to Marvel et al., issued July 19, 1966. That patent is hereby incorporated herein by reference. Polybenzimidazole polymer fibers suitable for use in the practice of the invention are commercially available from Celanese Fibers Marketing Corporation, P.O. Box 32414, Charlotte, N.C. 28232, under the trademark CELANESE PBI.

Processing and cure considerations limit the allowable polybenzimidazole polymer fiber content. Polybenzimidazole polymer fibers may typically be included in the elastomeric composition in an amount ranging from about 1 to about 4 percent by weight.

Optimum polybenzimidazole polymer fiber content for a particular elastomeric system will depend on the desired cure and mechanical characteristics of the system. The preferred polyisoprene composition contains about 23.7 percent by weight of polybenzimidazole polymer fiber.

A powder filler is used as a secondary reinforcing agent, and also improves the physical properties of the fiber filled elastomer. In this way, high erosion resistance is provided without substantially sacrificing the mechanical properties of the elastomer. The term "powder filler" as used herein means a combustion resistant powdered material with a particle size range, expressed as specific surface area, of from about 1 meter$^2$/gram to about 200 meter$^2$/gram. Suitable powder fillers include silica, iron oxide, titanium oxide, milled glass, carbon, ceramic clay, and mixtures thereof. Silica powder is preferred because of its low cost and because of its relatively low absorption of the elastomer, which minimizes drying of the composition during mixing. The preferred particle size is at least 20 millimicrons. One material useful herein is HI-SIL EP, sold by PPG Industries, Inc. Pittsburgh, Pa.

The fiber and powder filler are carried in a vulcanizable elastomeric composition comprising a vulcanizable elastomer and suitable vulcanizing agents. The term "vulcanizable elastomer" as used herein means any rubber-like substance having some degree of flexibility in the cured, vulcanized, or heat and pressure-converted state. Examples of suitable vulcanizable elastomers are natural rubbers, butyl rubbers, butadiene-styrene copolymer rubbers, nitrile rubbers, neoprene rubbers, polyurethane rubbers, polybutadiene rubbers, polyisoprene rubbers, silicone rubbers, chlorosulfonated polyethylene rubbers, polyacrylonitrile rubbers, polysulfide rubbers, fluorocarbon polymer rubbers, ethylene-propylene diene monomer rubbers, as well as various mixtures (including copolymers) of these rubbers. The preferred vulcanizable elastomer is commercially available as NATSYN 2200 from Goodyear Tire and Rubber Company, Akron, Ohio.

By vulcanizing agents are meant materials reacted with uncured vulcanizable elastomers to crosslink them, thereby effecting a cure. Preferred vulcanizing agents for use herein are zinc oxide, elemental sulfur, or mixtures of those agents.

The vulcanizable elastomeric compositions may optionally include cure accelerators such as polyethylene glycol, commercially available as CARBOWAX 4000 from Union Carbide Corporation, New York City, N.Y.; tetramethylthiuram monosulfide, commercially available as MONEX from Uniroyal Chemical, Naugatuck, Conn.; N-tert-butyl-2-benzothiazole-sulfenamide, commercially available as SANTOCURE NS from Monsanto Industrial Chemicals Company, St. Louis, Mo.; mixtures thereof; or other materials known to be useful for accelerating the curing process. Catalyst release agents such as stearic acid also may have utility in the present compositions.

Still another optional ingredient is an antioxidant to improve the longevity of the cured composition. One antioxidant useful herein is a mixture of mono-, di-, and tristyrenated phenols, for example the material known as AGERITE SPAR, available from the B.F. Goodrich Chemical Company., Cleveland, Ohio. Another antioxidant useful herein is diphenylamine reacted with acetone, commercially available as BLE-25 Liquid from Uniroyal Chemical Division, Naugatuck, Conn. ("CARBOWAX", "SANTOCURE", "MONEX", AGERITE" and "BLE" are trademarks.)

These optional ingredients are not critical and may be deleted or other materials may be substituted within the scope of the present invention.

DESCRIPTION OF PREFERRED EMBODIMENT

A preferred composition using polyisoprene as the elastomer is set out below:

|  | Percent By Weight |
|---|---|
| Elastomeric System | |
| NATSYN 2200 | 49.69 |
| Zinc oxide | 2.49 |
| CARBOWAX 4000 | 1.49 |
| Sulfur | 1.24 |
| Stearic acid | 0.99 |
| SANTOCURE NS | 0.75 |
| AGERITE SPAR | 0.50 |
| MONEX | 0.35 |
| B-L-E 25 Liquid | 0.25 |
| Reinforcing Agents | |
| HI-SIL EP | 22.37 |
| CELANESE PBI polymer fibers | 19.88 |
| TOTAL | 100.00 |

The silica and polybenzimidazole fiber reinforced elastomeric composition just described can be prepared by the following procedure:

1. The polyisoprene is added to a pre-warmed (135 degrees Fahrenheit, 57 degrees Celsius) Banbury mixer set at slow speed with cold water on full. The mixing clock is set.
2. After three minutes of slow, continuous mixing, the stearic acid, AGERITE SPAR, zinc oxide, B-L-E 25 Liquid, CARBOWAX 4000, and MONEX are added.
3. At the five minute mark, the HI-SIL EP silica powder and about 7 parts of CELANESE PBI polymer fibers are added. With continued mixing, the mix temperature should rise to approximately 145 degrees Fahrenheit (63 degrees Celsius).
4. After three more minutes of slow, continuous mixing, another 7 parts of CELANESE PBI polymer fibers are added. The mix temperature should rise as a result, to approximately 200 degrees Fahrenheit (93 degrees Celsius).
5. After another four minutes of slow mixing, the remaining CELANESE PBI polymer fibers are added. The mix temperature should rise to approximately 240 degrees Fahrenheit (116 degrees Celsius).
6. Mixing is stopped at the fifteen minute mark and the mixture is discharged into a container.
7. The mix is refined to approximately 0.010 inch (0.25 mm) thickness by passing it through a very tight roll mill five times. It is then allowed to cool.
8. The Banbury mixer is set for slow mixing and the clock is set. One half of the master mix is added, then the sulfur and SANTOCURE NS are added. Finally, the remaining half of the master mix is added.
9. When the mix temperature reaches 180 degrees Fahrenheit (82 degrees Celsius) after approximately seven minutes of slow mixing, the silica and polybenzimidazole polymer fiber reinforced composition is discharged into a container.

During the mixing process some of the polybenzimidazole polymer fibers are broken down from their original three inch length. Actual fiber length after mixing may range from about 0.02 mm to about 6.35 mm. Excessive mixing will lead to further fiber shortening. While we do not know of a critical fiber length, we believe that the longer the average fiber length, the more erosion resistant the insulation will be.

The insulation is applied to a rocket motor interior in the same manner as asbestos-reinforced elastomeric insulation. The uncured insulation is hand-washed with methylene chloride and allowed to dry. It is then "layed-up" into a rocket motor casing that has been primed with a bond promoter.

The insulation is oriented so the PBI fibers are circumferentially disposed with respect to the casing. The insulation is compressed into place with a pressurized bag and cured by heating the assembly to 170 degrees Fahrenheit (77 degrees Celsius) and maintaining that elevated temperature and pressure for approximately 16 hours.

The following examples are illustrative only and are not intended to limit the scope of the invention in any way. All quantities are expressed as parts by weight unless otherwise stated.

EXAMPLE I

Three sample insulation mixes were prepared with the composition listed in Table I below, in accordance with the mixing process set forth above. The mixes differ in the fiber fillers used: TI-R300 represents an asbestos-containing rocket motor insulation; TI-R700 contains silica powder only (no fiber filler); and TI-R704 contains both polybenzimidazolefibers and silica powder.

TABLE I

| Compound | Sample Insulation Mix (In Parts) | | |
|---|---|---|---|
| | TI-R300 | TI-R700 | TI-R704 |
| NATSYN 2200 | 100 | 100 | 100 |
| Zinc oxide | 5 | 5 | 5 |
| Stearic acid | 2 | 2 | 2 |
| Sulfur | 2.5 | 2.5 | 2.5 |
| AGERITE SPAR | 1 | 1 | 1 |
| B-L-E 25 Liquid | 0.5 | 0.5 | 0.5 |
| SANTOCURE NS | 0 | 1.5 | 1.5 |
| CARBOWAX 4000 | — | 3.0 | 3.0 |
| MONEX | — | 0.7 | 0.7 |
| HI-SIL (22 millimicron particle size) | — | 65 | 45 |
| CELANESE PBI polymer fibers | — | — | 50 |
| Asbestos fiber | 100 | — | — |
| HI-SIL | 5 | — | — |

After curing, the sample mixes were subjected to conventional physical testing. The results of these tests are listed in Table II.

TABLE II

| Compound | TI-R300 | TI-R700 | TI-R704 |
|---|---|---|---|
| Specific gravity | 1.37 | 1.18 | 1.20 |
| Hardness (Shore A) | 79 | 66 | 85 |
| Tensile with grain, psi | 1,289 | 1,616 | 1,118 |
| Tensile across grain, psi | 974 | 2,311 | 808 |

EXAMPLE II

Static Testing: Asbestos vs. PBI Fibers

The TI-R300 and TI-R704 insulation mixes were evaluated for erosion characteristics by static testing. Referring to FIG. 1, the insulation test motor was composed of four sections: an insulated test section 10 joined on one end to rocket motor 11 by insulated coupler 12, and joined on the opposite end to nozzle extension 13. The interior of the rocket motor contained center-perforated rocket propellant 14, which was ignited by conventional means (not shown). Insulated test section 10 was lined with rocket motor case insulation 15 to be tested. The rocket motor case insulation was uniformly tapered from a 0.5 inch (12.7 mm) thickness (at the edge of the insulated test section joined to the insulated coupler 12) to a maximum 2.5 inch (63.5 mm) thickness (at the opposite end of the insulated test section), thereby describing a nozzle of rocket motor case insulation having a minimum inside diameter of 1.0 inch (25.4 mm) where its slope reversed.

The burning time of the rocket propellant during static testing was typically about 5 seconds. Average interior pressure was typically 850 psi ($5.68 \times 10^4$ g/cm$^2$). The velocity of the combustion gas varied, according to the thickness of the rocket motor case insulation, from approximately 0.015 Mach at the 0.5 inch thickness to approximately 0.250 Mach at the 2.5 inch thickness.

The static test accurately simulated the intended environment of the rocket motor case insulation because the insulation to be tested was exposed to heat, pressure, turbulence and suspended aluminum oxide droplets.

Figure 2:
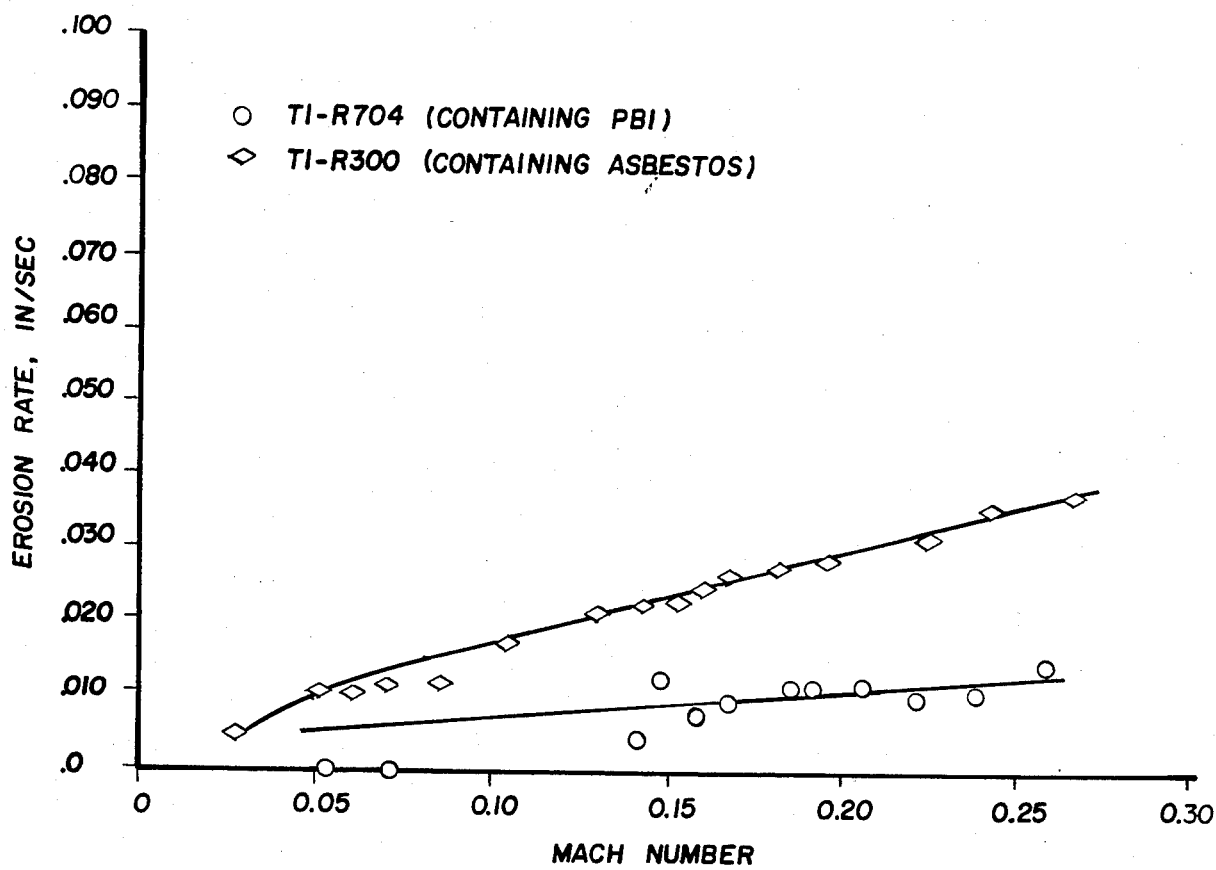
FIG. 2 is a graph of erosion rate of rocket insulation (measured in inches of insulation eroded per second of combustion) versus the velocity of the combustion gases inside the insulation test motor (measured in Mach numbers) for two insulation compositions.

The results of static tests of the TI-R300 and TI-R704 insulation compositions are plotted in FIG. 2. The polybenzimidazole polymer fiber and silica powder reinforced polyisoprene displayed less erosion than the asbestos reinforced polyisoprene at all combustion gas velocities measured.

EXAMPLE III

Static Testing: PBI vs Aramid Fibers

Three sample insulation mixes were prepared, all employing the vulcanizable elastomeric composition described in Table III:

TABLE III

| Compound | Parts by Weight |
| --- | --- |
| NATSYN 2200 | 100 |
| Zinc oxide | 5 |
| AGERITE SPAR | 1 |
| B-L-E 25 Liquid | 0.5 |
| Stearic acid | 2 |
| SANTOCURE NS | 1.5 |
| Sulfur | 2.5 |
| CARBOWAX 4000 | 3.0 |
| MONEX | .7 |

Polybenzimidazole polymer fibers, aramid polymer fibers, and silica powder were added to these sample insulation mixes as shown in TABLE IV:

TABLE IV

| Sample Insulation Mix | Parts PBI | Parts Aramid Fibers | Parts Silica Powder |
| --- | --- | --- | --- |
| L-8647-I | 80 | — | 45 |
| L-8647-H | 70 | — | 45 |
| L-8647-D | — | 20 | 5 |

Figure 3:
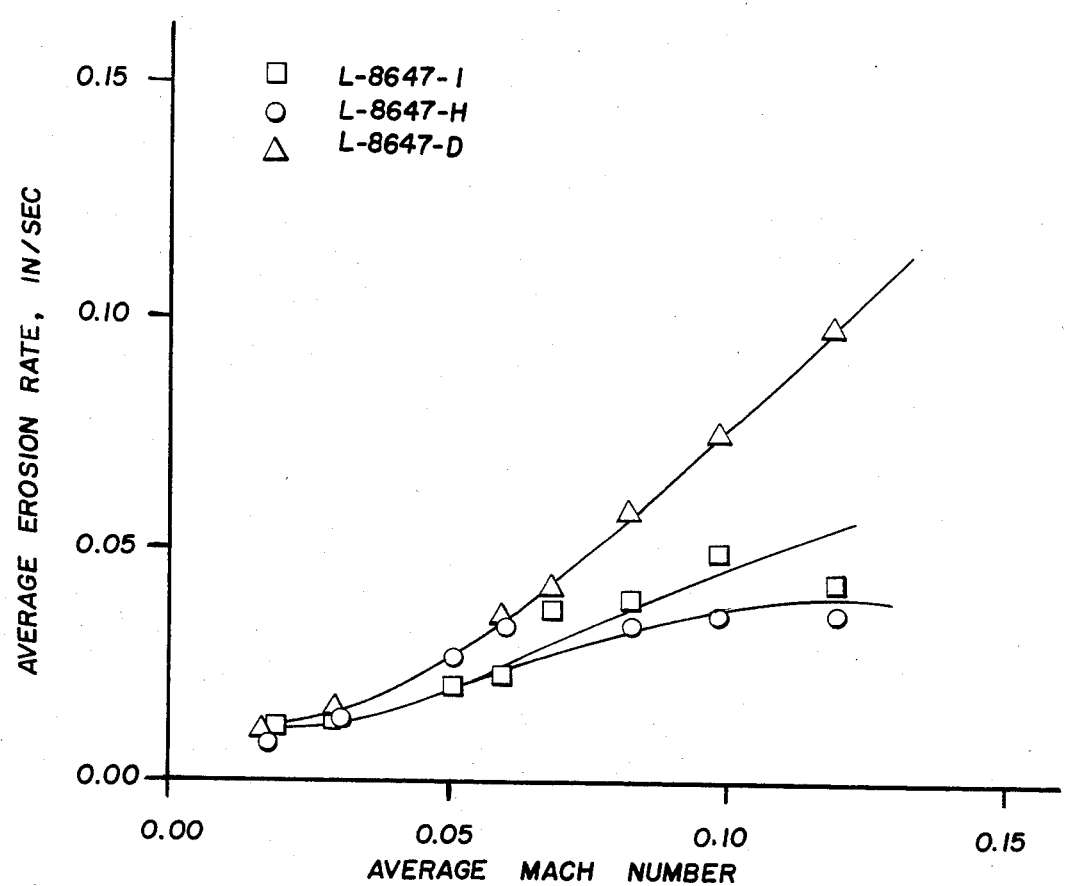
FIG. 3 is a graph similar to FIG. 2 for three additional insulation compositions.

The insulation mixes of Table IV were tested in an insulation test motor substantially according to FIG. 1, except that the insulation was formed as three circumferentially disposed segments separated by aluminum spacers. Each of the mixes was used to form one sector, allowing the three compositions to be evaluated under identical firing conditions. The internal pressure for this test was about 1500 psi ($1.02 \times 10^5$ g/cm$^2$). the resulting data is shown in FIG. 3, and illustrates that either test mix containing PBI fibers eroded substantially less than the test mix containing aramid polymer fibers. Although Table IV shows a lower level of silica powder for mix L-8647-D than for the others, it has been found that the erosion of mix L-8647-D is comparable to the erosion of a mix containing 45 parts silica powder and 20 parts aramid polymer fibers.

EXAMPLE IV

Static Testing—Amount of PBI fibers

Sample insulation mixes are prepared, employing the vucanizable elastomeric composition described in Table III, plus 45 parts silica powder, plus (respectively) 50, 40, and 30 parts of PBI fibers. Each has more erosion resistance in the erosion test motor than formulations containing the same amounts of asbestos or aramid polymer fibers.

What is claimed is:

1. A method of insulating a solid propellant rocket motor casing, comprising the step of applying to the interior surface of said rocket motor casing an elastomeric insulation comprising:
   A. from about 1 to about 40 percent by weight of polybenzimidazole polymer fibers;
   B. from about 1 to about 75 percent by weight of a powder filler; and
   C. a vulcanizable elastomeric composition.

2. The method of claim 1, wherein the polybenzimidazole polymer fiber content ranges from about 20 to about 40 percent by weight.

3. The method of claim 1, wherein said powder filler is composed of particles having an average particle size of at least 20 millimicrons.

4. The method of claim 1, wherein said powder filler is selected from the group consisting of silica, iron oxide, titanium oxide, carbon, milled glass, ceramic clays, and mixtures thereof.

5. The method of claim 1, wherein said powder filler comprises silica.

6. The method of claim 1, wherein said vulcanizable elastomer is selected from the group consisting of polyisoprene, polyacrylonitrile rubbers, butyl rubbers, butadiene-styrene copolymer rubbers, nitrile rubbers, polybutadiene rubbers, silicone rubbers, chlorosulfonated polyethylene rubbers, fluorocarbon polymer rubbers, ethylene-propylene diene monomer rubbers, polysulfide rubbers, neoprene rubbers, polyurethane rubbers, natural rubbers, or mixtures thereof.

7. The method of claim 1, wherein said vulcanizable elastomer comprises cis-1,4, polyisoprene.

8. A substantially asbestos free elastomeric rocket motor case insulation material, comprising:
   A. from about 1 to about 40 percent by weight of polybenzimidazole polymer fibers;
   B. from about 1 to about 15 percent by weight of a powder filler; and
   C. a vulcanizable elastomer comprising cis-1,4-polyisoprene.

* * * * *

UNITED STATES PATENT AND TRADEMARK OFFICE
CERTIFICATE OF CORRECTION

PATENT NO. : 4,600,732
DATED : July 15, 1986
INVENTOR(S) : Kenneth E. Junior, James D. Byrd and James O. Hightower, Jr.

It is certified that error appears in the above—identified patent and that said Letters Patent is hereby corrected as shown below:

Column 1, line 24, "insulating" should read -- insulation --.

Column 3, line 27, "4" should read -- 40 --.

Signed and Sealed this

First Day of November, 1988

*Attest:*

DONALD J. QUIGG

*Attesting Officer*  *Commissioner of Patents and Trademarks*